United States Patent [19]
Mutolo et al.

[11] Patent Number: 5,328,269
[45] Date of Patent: Jul. 12, 1994

[54] METHOD OF AND APPARATUS FOR PRELOADING AN ANTI-FRICTION BEARING

[75] Inventors: Frank V. Mutolo, Morrisville; Fausto G. Mariazzi, Feasterville, both of Pa.

[73] Assignee: Ina Linear Technik, Inc., Bensalem, Pa.

[21] Appl. No.: 13,407

[22] Filed: Feb. 4, 1993

[51] Int. Cl.⁵ .............. F16C 29/12; F16C 33/64; F16C 43/04; B21D 53/10
[52] U.S. Cl. .......................... 384/57; 29/724; 29/898.03; 29/898.09; 384/49; 384/59; 384/500; 384/556
[58] Field of Search ............ 384/10, 49, 50, 57, 384/59, 499, 500, 502, 504, 505, 510, 512, 517, 537, 556, 559, 563, 584; 29/898.03, 898.061, 898.062, 898.09, 724

[56] References Cited

U.S. PATENT DOCUMENTS

| | | |
|---|---|---|
| 1,441,842 | 1/1923 | Fox . |
| 3,220,091 | 11/1965 | Reef . |
| 3,245,512 | 4/1966 | Heyer .............. 29/898.03 X |
| 3,651,550 | 3/1972 | Bennett .............. 384/504 X |
| 3,871,093 | 3/1975 | Ladin . |
| 3,900,232 | 8/1975 | Rode .............. 29/898.09 X |
| 3,986,754 | 10/1976 | Torrant .............. 384/504 |
| 4,419,816 | 12/1983 | Kapaan et al. .............. 29/724 |
| 4,425,009 | 1/1984 | Fillon et al. . |
| 4,476,614 | 10/1984 | Pittroff .............. 384/510 X |
| 4,867,579 | 9/1989 | Gallone .............. 384/53 |

*Primary Examiner*—Thomas R. Hannon
*Attorney, Agent, or Firm*—Wigman, Cohen, Leitner & Myers

[57] ABSTRACT

A method of and apparatus for adjusting the preload of an anti-friction bearing is disclosed. A compressive load is applied to the opposite transverse faces of the outer races of a linear bearing by hydraulic or pneumatic cylinders. While the bearing assembly is held in compression, a test force is applied to one end of the inner race or slide in a direction parallel to its constrained direction of travel to cause the slide to move through the bearing at a steady rate of travel. While the slide is in motion, rolling friction characteristics are measured by a force gauge. The resulting force gauge measurement corresponds to a particular bearing preload. The compressive load is re-adjusted as necessary under control of a closed-loop feedback system to achieve a value in an acceptable preload range, followed by final assembly of the bearing with a layer of high-strength adhesive applied to the overlapping flanges of the bearing to create a bond having sufficient strength with which to retain that preload for the anticipated service life of the bearing.

26 Claims, 1 Drawing Sheet

METHOD OF AND APPARATUS FOR PRELOADING AN ANTI-FRICTION BEARING

FIELD OF THE INVENTION

This invention relates generally to anti-friction bearings of the type having a plurality of rolling elements constrained to travel between opposing races, and more particularly to a method of assembling an anti-friction bearing with a preload corresponding to a preselected bearing friction between the rolling elements and the races of linear or rotary bearings, and the linear and rotary bearings assembled thereby.

BACKGROUND OF THE INVENTION

Anti-friction bearings such as rolling contact bearings support and locate translating and rotating machine elements with a minimum amount of friction therebetween. These machine elements, such as shafts, spindles, or slides commonly used in machine tools and precision equipment, are often configured to translate or rotate with controlled clearance and minimum backlash in the radial or axial directions, generally with controlled or predetermined clearance between the machine element and the rolling elements. Each anti-friction bearing is provided with a plurality of rolling elements, also known as anti-friction elements, such as balls, needles, or rollers. Paired opposing races bracket the rolling elements, which may be spaced apart one from the next by a cage, separator, retainer, or the like. Precision ground or machined raceway surfaces are often provided in the races to minimize rolling friction between the rolling elements and the races. Alternatively, precisely machined inserts may be installed in the races to provide a smooth, low-friction running surface for the rolling elements.

The load bearing capacity and life of anti-friction bearings is dependent on factors such as radial clearance and tolerance between the rolling elements and races, operating loads and environment, type of cage and cage materials, bearing size and type, bearing lubrication, and machine operating speeds. The coefficient of rolling friction of anti-friction bearings is substantially less than the coefficient of friction of sliding surfaces and is far more constant. However, a constant low coefficient of friction of predetermined magnitude is often required in those applications where stick-slip action impairs rolling performance. Accordingly, preloading anti-friction bearings provides this constant low coefficient of friction, and also increases rigidity, the ability to take moments and therefore the guidance accuracy of the bearing assembly, thereby enhancing bearing service life and performance characteristics, such as reduced frictional resistance and fatigue life. Conversely, preloading which causes uneven or overloading of the rolling members may result in pitting, spalling, or cracking at the bearing surface of the rolling members, resulting in premature bearing failure.

Heretofore, controlled clearance anti-friction bearings were assembled, and when required preloaded, by one of three conventional methods. However, these conventional methods of assembly and preloading were either time-consuming, labor intensive, imprecise, and/or inefficient in achieving the goal of economical production of anti-friction bearings manufactured to very accurate tolerances to provide a controlled clearance ("precision fit") having predetermined anti-friction characteristics.

According to one conventional method of assembling an anti-friction bearing, the races of the bearing are machined to very close tolerances to provide a controlled clearance ("precision fit"), at relatively high costs in terms of labor and equipment.

According to another conventional method, like-sized rolling members are graded and selected for each bearing or each group of bearings to provide the tolerances necessary for bearing friction loading.

A third conventional method of assembling and preloading an anti-friction bearing is to provide a plurality of bearing assembly adjusting screws between the outer races of the bearing which are then systematically tightened to approach a generally uniform friction loading over the diameter/length of the bearing. This third method is difficult to implement uniformly since the screws must be adjusted in an even manner to uniformly alter the resulting pressure on the rolling elements. Furthermore, the adjusting screws are subject to loosening due to machine-generated shock and vibration if not permanently restrained in the adjusted position, which thereby prevents any further adjustment.

Accordingly, it is desirable to provide a method of accurately and precisely setting a uniform, predetermined magnitude of bearing friction along the length/circumference of a linear/rotary anti-friction bearing assembly, and to provide an anti-friction bearing for which such adjustment may be efficiently and precisely made. It is also desirable to permanently restrain the bearing in the resulting adjusted position for the duration of its anticipated service life. That is, it is desirable to assure precision preloading with predetermined friction characteristics of the rolling elements within an anti-friction bearing assembly, thereby maximizing service life and ensuring uniform and predetermined load bearing capability with minimum assembly time and cost.

OBJECTS AND SUMMARY OF THE INVENTION

It is, therefore, a principal object of the present invention to provide a method of assembling an anti-friction bearing having a uniform, predetermined preload along the length of a linear anti-friction bearing or about the circumference of a rotary anti-friction bearing.

It is another object of the present invention to provide a linear or rotary anti-friction bearing which is preloaded and assembled by the method of the present invention.

It is further object of the present invention to provide a method of assuring precise location, accurate alignment and close fit, with substantially no backlash, of the rolling members within their containing races.

It is yet another object of the present invention to provide a simplified, time- and cost-efficient method of assembling an anti-friction bearing.

It is yet a further object of the present invention to provide a simplified method of assembling an anti-friction bearing using an assembly fixture in conjunction with computer-controlled feed-back circuitry for enabling high-volume production of anti-friction bearings having predetermined performance characteristics.

These and other objects are accomplished according to the present invention by providing a method of adjusting the preload of rolling elements in anti-friction bearings, such as the rolling elements which support and position an inner race, also known as a slide, between the outer races of a linear anti-friction bearing assembly. The rolling elements are mounted in two retaining cages which are positioned at the opposite, lateral edges of the slide. Following assembly and alignment of the bearing races and rolling elements at an initial assembly position in the assembly fixture of the present invention, an initial compressive load produced by a hydraulic or pneumatic source, is evenly applied against the bearing assembly along the length of the outer races corresponding to the lateral dimension of the slide.

While the bearing assembly is held in compression by the hydraulic or pneumatic load, a test force is applied to one end of the slide in a direction parallel to its constrained direction of travel to cause the slide to move through the bearing preferably at a steady rate of travel. While the slide is in motion, rolling friction characteristics are measured by a force gauge held in opposing relationship to the opposite end of the slide. The resulting force gauge measurement corresponds to a particular bearing preload. If the measurement does not fall within a prescribed range of acceptable preload values, then the compressive force is re-adjusted, the slide is reciprocated through the bearing, and a second force measurement is made.

This procedure is repeated until an acceptable value of preload is achieved, at which time laterally overlapping flanges extending from the outer races are bonded together with a layer of high-strength adhesive or with mechanical connections such as bolts or rivets or spot welds having sufficient strength with which to retain that preload over the anticipated service life of the bearing. In a production line environment, computer controlled adjustment of the preload is conducted and then checked through a closed-loop feed-back system followed by final assembly in the aforementioned manner.

Accordingly, consistent and known preload settings of the anti-friction bearing are checked and corrected before distribution and field installation in a designated apparatus. Tighter control of the preload therefore results in longer service life with a higher level of operating precision.

With the foregoing and other objects, advantages and features of the invention that will become hereinafter apparent, the nature of the invention may be more clearly understood by reference to the following detailed description of the invention, the appended claims and to the several views illustrated in the drawings.

DETAILED DESCRIPTION OF THE PREFERRED EMBODIMENTS

Figure 1:
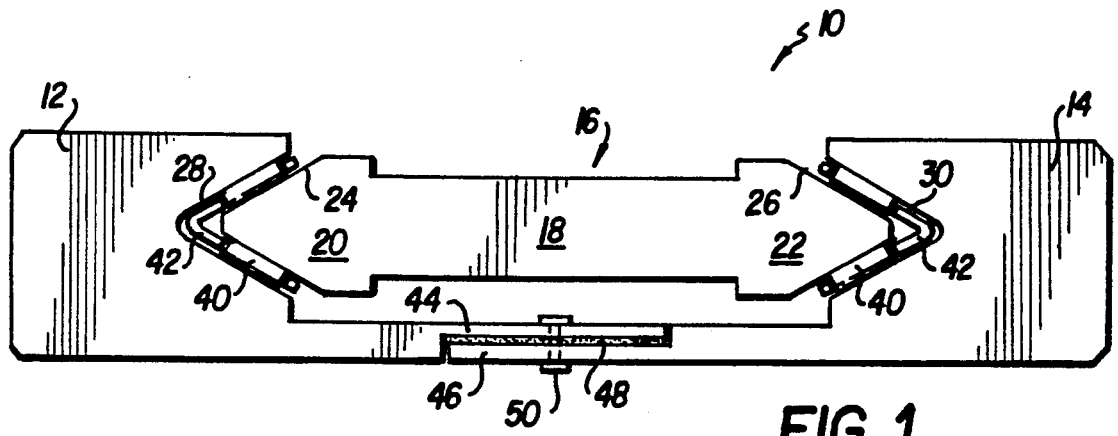
FIG. 1 is a cross-sectional view of an assembled linear bearing of the present invention, showing the inner race or slide slidably installed between a pair of outer races, the slide retained in slidable relation between the outer races by an array of rolling elements.

Referring now in detail to the drawings wherein like parts are designated by like reference numerals throughout, there is illustrated in FIG. 1 a linear bearing assembled according to the method of the preferred embodiment of the invention, designated generally by the numeral 10.

The linear bearing 10 comprises paired, outer races 12, 14 for supporting an inner race or slide 16 in slidable arrangement therebetween. The slide 16 is comprised of a central web portion 18 provided with a pair of tapered flanges 20, 22 integrally formed in symmetrical relationship at the opposing lateral edges of the web portion 18. The tapered flanges 20, 22 are each formed with a V-shaped bearing surface or raceway 24, 26, respectively, each plane of the V-shaped surface extending in a direction offset from the plane of the web 18. The outer races 12, 14 are provided with bearing surfaces or raceways 28, 30, respectively, corresponding in substantially parallel relationship to the raceways 24, 26 of the slide 16. As is well known in the bearing art, the bearing surfaces or raceways 24, 26, 28, 30 are precision ground or machined to minimize rolling friction. Alternatively, precisely machined inserts (not shown) may be installed in the races to provide smooth, low-friction running surfaces.

A plurality of rolling elements 40 are disposed in the spaces defined by the resulting paired raceways 24, 28 and 26, 30. The rolling elements 40, such as balls, needles, or rollers, are positioned in spaced array by a retaining cage 42 of conventional design so as to maintain the rolling elements 40 in rolling alignment during operational translation of the slide 16 in the fully assembled linear bearing 10.

According to one embodiment of the linear bearing of the present invention, a first flange 44 integrally formed with outer race 12 extends towards outer race 14 in a direction parallel to the operational plane of the slide 16. A second flange 46 integrally formed with outer race 14 extends towards and overlaps the first flange 44. The flanges are securely adhered together by a layer of conventional anaerobic, high-strength adhesive 48 or a mechanical connector such as a rivet or bolt 50 (or combination of adhesive 48 and mechanical connector 50) having sufficient strength with which to retain a preload over the course of the anticipated service life of the bearing after it has been preloaded according to the method of testing and assembly of the present invention, as will be further discussed in greater detail. Alternatively, the flanges are securely adhered together by a welded connection such as an array of spot welds.

Figure 2:
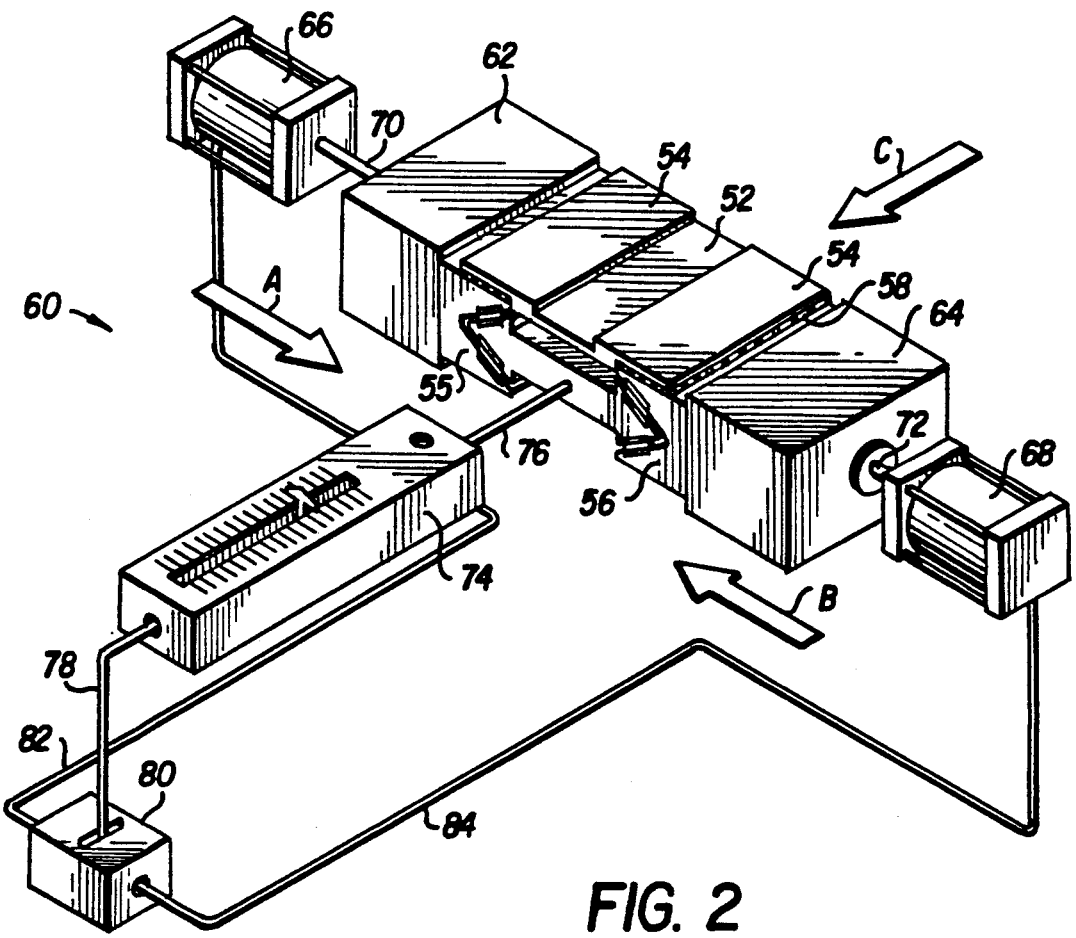
FIG. 2 is a diagrammatic view of the linear bearing assembly and testing fixture of the present invention, showing compression and test force apparatus with related force gages and controller, ready for preloading adjustment of the linear bearing assembly.

Another embodiment of the linear bearing assembly of the present invention is shown in FIG. 2. According to this second embodiment, outer races 55, 56 have no integrally formed, laterally extending flanges. Instead, this embodiment provides a separate plate member 52 having opposedly extending leaves 54 integrally formed in a step-like arrangement therewith. The plate member 52 bridges the outer races 55, 56 such that the leaves 54 overlap the underlying sides of the races 55, 56. An adhesive 58 is layered between the leaves 54 and outer races 55, 56 to securely fix the resulting bearing assembly with a predetermined preload after preloading and assembly, as will now be described.

FIG. 2 diagrammatically represents a linear bearing assembly preload adjusting system 60 of the present invention. The linear bearing assembly of either embodiment is installed between a pair of precision blocks 62, 64 having precision-faced surfaces which are juxtaposed against the outer transverse faces of the outer races 12, 14, 55, 56. An initial compressive load is applied to the outer races 12, 14, 55, 56 by hydraulically- or pneumatically- generated force. More specifically, the initial compressive load is transferred through the precision blocks 62, 64 to the bearing assembly by hydraulic or pneumatic cylinders 66, 68 acting through shafts 70, 72, in the directions of arrows A, B, respectively. Alternatively, one of the cylinders 66, 68 is held in a static position, or may be replaced with a fixed-position end-block (not shown) during operation of the adjusting system 60.

Following initial assembly and alignment of the bearing assembly 10 at the initial assembly position within the adjusting system 60, the initial compressive force, which is of known magnitude, is evenly applied to the outer races 12, 14, 55, 56 along their length corresponding to the lateral dimension of the bearing slide 16. While the bearing assembly is held in compression by the initial compressive force, a test force represented by arrow C is applied to one end of the slide 16 in a direction substantially parallel to its constrained direction of travel so as to cause the slide 16 to move through the bearing assembly 10 at a steady rate of travel.

While the slide 16 is in motion, rolling friction characteristics are measured by a force gauge 74 having a probe 76 which is held in opposing relationship to the opposite end of the slide 16. The force gauge 74 may have a conventional spring-activated configuration, or other suitable force or pressure transducer configuration, as would be apparent to the skilled artisan in the bearing arts. The resulting force gauge measurement, which corresponds to a particular bearing preload, is outputted through electrical lead 78 to a system controller 80. The controller 80 then compares the resulting measurement with a preselected range of acceptable preload values. If the measurement does not fall within this range, then the appropriate feedback signal is transmitted through electrical leads 82, 84 to cause an increase or decrease in the compressive load generated by the cylinders 66, 68 against the outer races 12, 14, 55, 56. The test force is again applied to the slide 16 in the manner previously described, and a subsequent force gauge measurement of bearing preload is outputted to the controller 80 for comparison with the preselected range of acceptable preload.

According to this closed feedback loop, the controller 80 directs the adjustment, either continuous or incremental, of compressive force against the bearing assembly 10 and causes reciprocation of the slide 16 until an acceptable bearing adjustment has been achieved. Alternatively, the controller 80 may be programmed to indicate a failed bearing if an acceptable adjustment is not achieved after a predetermined number of cycles of the adjusting system 60.

In order to maximize production throughout while accounting for eccentricities in the rolling members 40 and surface deviations in the raceways 24, 26, 28, 30, it has been determined that the slide 16 should be translated through the bearing assembly 10 a minimum distance equal to the outer diameter of the largest rolling member 40. Reciprocation of the slide 16 through this relatively short distance in combination with rapid pulsing of the cylinders 66, 68 enables rapid adjustment of each bearing assembly. It is estimated that a complete cycle of fixturing, preload adjusting, and securing of the adjusted bearing assembly 10 by the method of the present invention can be completed within approximately five (5) seconds under production line operating conditions, which is approximately 1/60th the time required to assemble and adjust linear bearings using the fastest prior art method.

Once acceptable preload adjustment of the bearing assembly 10 has been achieved, the flanges 44, 46 or plate 52 and leaves 54 of the various embodiments are secured together by an adhesive, mechanical, or welded connection in the manner previously described so as to retain that preload over the course of the anticipated service life of the bearing.

Although certain preferred embodiments of the invention have been described herein, it will be apparent to a person skilled in the art to which the invention pertains that variations and modifications of the described embodiments may be made without departing from the spirit and scope of the invention. Accordingly, it is intended that the invention be limited only to the extent required by the appended claims and the applicable rules of law.

What is claimed is:

1. A preload bearing having a pair of races with rolling members positioned therebetween which is assembled and preloaded within a predetermined preload range during manufacture by the process of:
    (a) fitting the rolling members within the raceways of the races in rolling relationship therebetween;
    (b) translating one race member relative to the opposing race member in an operational direction of travel;
    (c) measuring a bearing preload between said race members and comparing said measurement with the predetermined preload;
    (d) applying a compressive force to at least one of said race members if the measured preload is not within the predetermined preload range;
    (e) repeating steps (b)-(d) if necessary until the measured preload is within said predetermined range; and
    (f) securing the race members in registered orientation to maintain the measured preload.

2. The preloaded bearing of claim 1, wherein one of said race members is translated relative to he opposing race member through a minimum linear displacement equal to the outer diameter of the largest rolling member.

3. The preloaded bearing of claim 1, further comprising a pair of concentrically aligned raceways, wherein one race member is translated relative to the opposing race member through a minimum angular displacement equal to the outer diameter of the largest rolling member.

4. The preloaded bearing of claim 1, further comprising a flange integrally formed with each race member, and permanently affixing together the flanges with securing means.

5. The preloaded bearing of claim 4, wherein said securing means comprises a layer of anaerobic adhesive provided between the flanges.

6. The preloaded bearing of claim 4, wherein said securing means comprises a welded connection between the flanges.

7. The preloaded bearings of claim 1, wherein said compressive force applying means is hydraulically powered.

8. The preloaded bearing of claim 1, wherein said compressive force applying means is pneumatically powered.

9. The preloaded bearing of claim 1, wherein said friction measuring means comprises a spring-loaded force gauge.

10. The preloaded bearing of claim 1, wherein said process is controlled by a computerized numerical controller.

11. A method of assembling an anti-friction bearing having a preload within a predetermined range, said bearing including a plurality of rolling members, and a pair of race members having raceways in opposing relationship for retaining said rolling members, comprising the steps of:
(a) fitting the rolling members within the raceways in rolling relationship therebetween;
(b) translating one race member relative to the opposing race member in an operational direction of travel;
(c) measuring a bearing preload between said race members and comparing said measurement with the predetermined preload;
(d) applying a compressive force to at least one of said race members if the measured preload is not within the predetermined preload range;
(e) repeating steps (b)-(d) if necessary until the measured preload is within said predetermined range; and
(f) securing the race members in registered orientation to maintain the measured preload.

12. A method of assembling with a predetermined preload a linear anti-friction bearing of the type having a plurality of rolling members, and an inner race member and a pair of outer race members having raceways in opposing relationship to the raceways of the inner race member, comprising the steps of:
(a) fitting together the inner race member, the outer race members, and the rolling members in rolling relationship therebetween;
(b) translating the inner race member relative to the outer race member in a substantially straight line motion therebetween;
(c) measuring a bearing preload between the race members and comparing said measurement with the predetermined preload;
(d) applying a compressive force to one of said outer race members in a direction substantially perpendicular to the direction of travel of the inner race member if the measured preload is less than the predetermined preload;
(e) repeating steps (b)-(d) if necessary until the measured preload is within said predetermined range; and
(f) securing the race members in registered orientation to maintain the measured preload.

13. The method of claim 12, further comprising the step of permanently securing together the race members.

14. The method of claim 12, wherein the inner race member is translated against the outer race members through a minimum displacement equal to the outer diameter of the largest rolling member.

15. The method of claim 12, further comprising the step of releasing the compressive force if the measured preload is greater than the predetermined preload.

16. A method of assembling an anti-friction rotary bearing having a preload within a predetermined preload range, said bearing including a plurality of rolling members, and an inner race member and an outer race member having raceways in opposing relationship therebetween, comprising the steps of:
(a) fitting together the inner race member, the outer race member, and the rolling members in rolling relationship therebetween;
(b) rotating the inner race member relative to the outer race member in a curvilinear motion therebetween;
(c) measuring a bearing preload between the race members and comparing said measurement with the predetermined preload;
(d) applying a compressive force to the outer race member in a substantially radially inward direction toward the inner race member if the measured preload is not within the predetermined preload range;
(e) repeating steps (b)-(d) if necessary until the measured preload is within said predetermined range; and
(f) securing the race members in registered orientation to maintain the measured preload.

17. An apparatus for preloading within a predetermined range of friction characteristics a linear anti-friction bearing of the type having a plurality of rolling members, an inner race member, and a pair of outer race members having raceways in opposing relationship to the raceways of the inner race member, comprising:
a pair of retaining blocks having precision-faced surfaces for receiving in nesting relationship the corresponding outer faces of the outer race members, at least one of said blocks being adjustable in a direction substantially perpendicular to the direction of travel of the inner race member;
means for applying a measured compressive force to one of said precision blocks in a direction substantially perpendicular to the direction of travel of the inner race member;
means for applying a measured test force to the inner race member in a direction substantially parallel to the constrained direction of travel of the inner race member within the bearing;
means for measuring a set of friction characteristics of the inner race member within the bearing corresponding to the applied test force and compressive force;
means for comparing the set of measured friction characteristics with the predetermined range of friction characteristics;
means, responsive to the comparison means, for adjusting the compressive force; and
means for securing together the outer race members to maintain the measured preloaded configuration.

18. The preloading apparatus of claim 17, further comprising a flange integrally formed with each outer race member, said flanges extending toward each other in overlapping relationship and fixedly secured together by said securing means.

19. The preloading apparatus of claim 18, wherein said securing means comprises a layer of anaerobic adhesive disposed between said overlapping flanges.

20. The preloading apparatus of claim 18, wherein said securing means comprises a mechanical connector fixedly clamping together said overlapping flanges.

21. The preloading apparatus of claim 18, wherein said securing means comprises a welded connection between the overlapping flanges.

22. The preloading apparatus of claim 17, further comprising a plate member having end portions extending to each outer race member in overlapping relationship therewith, each end portion fixedly secured to the overlapped surface of the corresponding race member by a layer of anaerobic adhesive disposed therebetween, to permanently secure together the outer race members in the measured preloaded configuration.

23. The preloading apparatus of claim 17, wherein said compressive force applying means is hydraulically powered.

24. The preloading apparatus of claim 17, wherein said compressive force applying means is pneumatically powered.

25. The preloading apparatus of claim 17, wherein said friction measuring means comprises a spring-loaded force gauge.

26. The preloading apparatus of claim 17, wherein said apparatus is operated by a computerized numerical controller.

* * * * *